STEVEN J. TOROK
INVENTOR.

BY Robert G. Clay

ATTORNEY

STEVEN J. TOROK
INVENTOR.

BY Robert G. Clay

ATTORNEY

United States Patent Office 3,333,065

Patented July 25, 1967

3,333,065

APPARATUS FOR REDUCING FRICTIONAL WEAR OF A TRANSDUCING HEAD AGAINST A MAGNETIC TAPE

Steven J. Torok, San Carlos, Calif., assignor to Ampex Corporation, Redwood City, Calif., a corporation of California Filed July 25, 1963, Ser. No. 297,717
5 Claims. (Cl. 179—100.2)

This invenion relates to magnetic tape transports, and particularly to mounts for the transducers thereof.

Previously, magnetic tape transports have included an erase head mounted upstream, in relation to the tape path and direction, from the record head. The erase head is usually operated during the record mode of operation of the transport to ensure that the tape is clear immediately prior to being recorded upon. During other modes of operation of the transport, the erase head is usually not needed, but continues to engage the tape causing undue frictional wear. Furthermore, excessive tape wear is caused by this head during starting, stopping and changing modes, because a transient increase of tape tension and frictional force usually occurs during acceleration and deceleration of the tape.

Accordingly, it is an object of this invention to provide an apparatus for reducing the frictional wear of a transducing head against a magnetic tape in a tape transport.

It is another object of this invention to provide a transducer mount and means for operating same to automatically eliminate a major portion of tape wear ordinarily caused by the transducer during changes in the operating mode of the transport.

These and other objects of the invention are accomplished by an apparatus in which the erase head is mounted on a pivoting arm between a pair of tape guides, so as to swing into and out of engagement with the tape segment between the guides. A solenoid for operating the pivoting arm is coupled electrically to the mode-selection control system of the transport so that the head is automatically brought into engagement with the tape only during the record mode and is swung away during other modes, reducing wear on the tape. A dashpot is coupled to delay operation of the arm for a short interval immediately following the selection of a new mode, when the tape is accelerating or decelerating and when the resulting tension is greater than normal. Thus the head is never brought into engagement with the tape until the tension has returned to normal, and wear due to excessive tension is avoided.

A better understanding of the invention may be had by reference to the following description, taken in conjunction with the accompanying drawings, in which.

Figure 1:
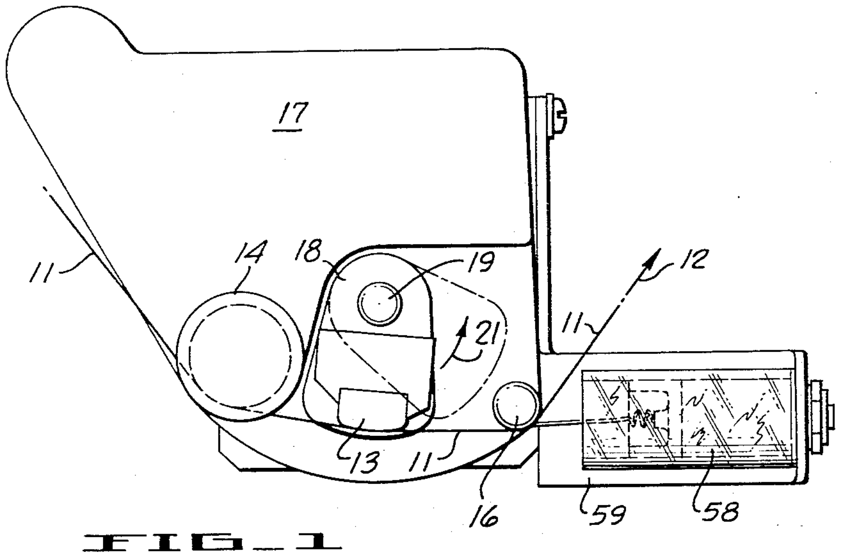
FIGURE 1 is a plan of the device of the invention.
Figure 3:
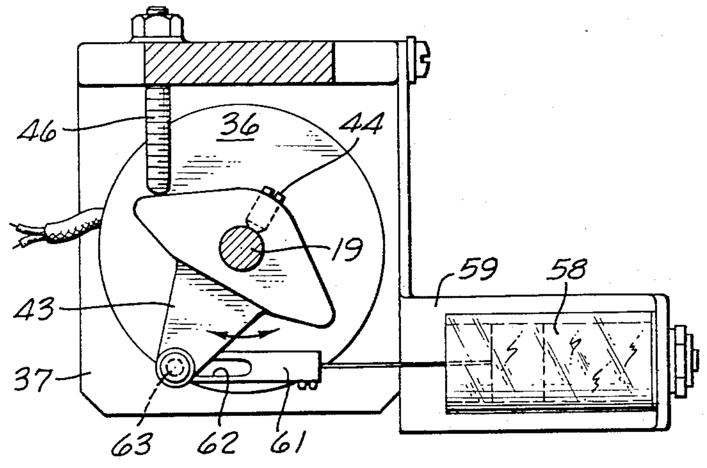
FIGURE 3 is a cross-section taken on the plane of lines 3—3 of FIGURE 2.

Referring now to the drawings, and particularly to FIGURE 1 thereof, there is shown a tape 11 being guided in the direction of arrow 12 from a supply reel (not shown) to a recording and reproducing head assembly (not shown) and a takeup reel (not shown). An erase head 13 is arranged to engage the tape at a point upstream on the tape path from the recording and reproducing head assembly. The path of the tape in the vicinity of the head 13 is established as by means of a rotating guide 14 and a stationary guide 16 extending from a mounting plate 17. The head 13 as shown in the drawing is positioned so as to obtrude slightly into the path of the tape between the guides 14 and 16, so that when there is tension in the tape, the latter frictionally engages the head in passage.

Because the erase head 13 is ordinarily used only during the record mode, and because frictional wear of the tape is not desirable, the head 13 is mounted so as to be movable away from the tape when the transport is operating in modes other than record. In particular, the head 13 is mounted to extend from an arm 18 that is in turn mounted for pivoting motion on a shaft 19 aligned in a plane parallel to the flat side of the tape and transverse to the length of the tape. Thus, the arm may be pivoted to move the head 13 in the direction of the arrow 21 to a retracted position illustrated in dashed lines in the figure. It will be noted that the tape continues to be guided by the guides 14 and 16 when the head is in the retracted position and does not follow the head, so that the tape and head are disengaged.

Figure 2:
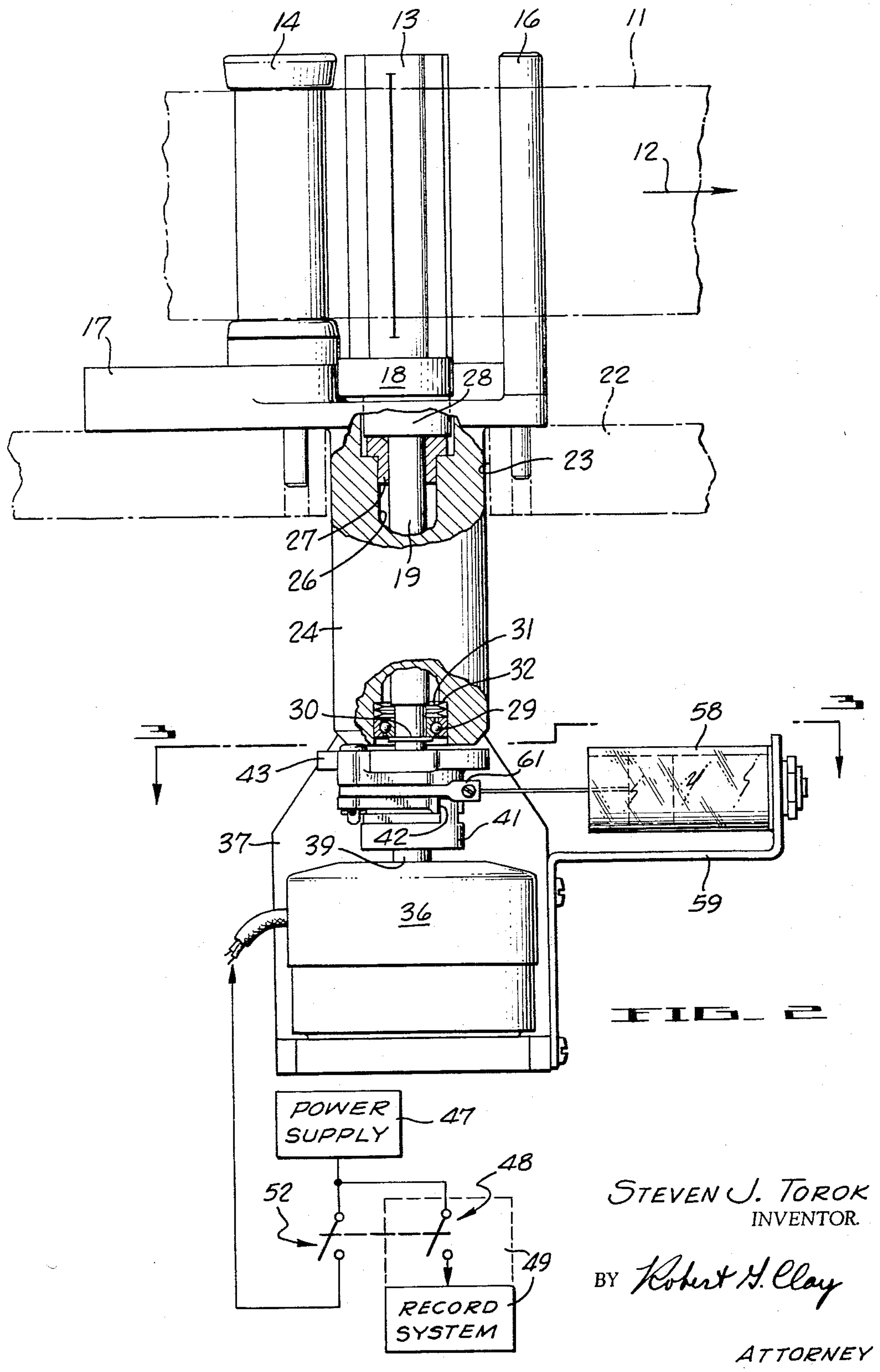
FIGURE 2 is a broken-away elevation of the device of FIGURE 1.

As shown in FIGURE 2, the plate 17 serves as a journal mounting for the shaft 19 and is in turn mounted on the top plate 22 of the transport. In particular, the top plate has an opening 23 formed therein through which descends an extension 24 of the plate 17, the extension 24 being provided with a bore 26 for journalling the shaft. A flanged sleeve bearing 27 is press fitted into the upper end of bore 26 and bears against a shoulder 28 formed on the arm 18, to accurately position the erase head 13 in a vertical direction. A ball bearing 29 is fitted on the lower portion of the shaft 19 inside an enlarged portion of the bore 26, and is retained on the shaft by means of a retaining ring 30 engaging an appropriate recess in the shaft. A Belleville spring 31 is provided between the outer race of bearing 29 and a lower shoulder 32 of the bore 26, to urge the upper shoulder 28 into accurate engagement with the bearing 27, thus ensuring the positioning required for the head, as above noted.

To operate the shaft 19, a rotary solenoid 36 is mounted on a bracket 37 extending from the extension 24. The shaft 39 of the solenoid has a lug member 41 mounted thereon and mating with a female recess 42 in an arm 43. The arm 43 is affixed to the lower end of the shaft 19 as by means of a set screw 44. A long set screw 46 is threaded through the bracket 37, and extends to form an adjustable stop for limiting movement of the arm 43 in the engaged position of the head 13.

For automatic operation of the device, the solenoid 36 is coupled to the record system of the transport in such a way that the solenoid is energized only when the record system is operating. For example, a power supply 47 is shown coupled through a switch 48 to the record system 49, and the solenoid 36 is coupled to the power supply 47 through a switch 52, gauged with the switch 48. The switch 48 forms part of the record system, and is operated (closed) manually or by other manually operated mechanisms to place the transport in record mode. When the switch 48 is closed, then so is the switch 52, and the solenoid 36 is energized. When the transport is placed in any other mode of operation, the switch 48 is opened as part of the process, and the switch 52 is also opened to de-energize the solenoid. The solenoid 36 is of a type well known in the art and includes a return spring (not shown) for returning the shaft 19 and head 13 to the retracted position (FIGURE 1) whenever the solenoid is not energized. Thus it will be seen that the head 13 is automatically withdrawn from physical contact with the tape 11 whenever it is not actually being used, and allows the frictional contact with the tape to be enormously reduced.

It will be understood that whenever the tape is started, stopped or the speed is increased or decreased, a transient excess of tension usually occurs because of the differential action of the various tape moving elements upon the tape. If the erase head 13 is in the retracted position and is to be put into engaged position as for beginning a record mode of operation of the transport, it is desirable to delay the movement of the head into the engaged position until after the transport has been safely started, and until after the transient excess of tension has come and gone, so that the corresponding excessive frictional wear of the tape against the head is avoided. For this purpose, a dashpot 58 is mounted on a bracket 59 that extends from the bracket 37, and is coupled to the arm 43 through a link member 61 to damp the motion of the latter toward the engaged position of the head 13. The link member 61 has a slot 62 engaged by a pin 63 of the arm 43, so that the dashpot 58 is operated only near the ends of the stroke of arm 43. Thus the engagement of the head is always automatically delayed for an interval just long enough to avoid the period of excessive tape tension.

Thus, there has been described an apparatus in which the erase head is mounted on a pivoting arm between a pair of tape guides, so as to swing into and out of engagement with the tape segment between the guides. A solenoid for operating the pivoting arm is coupled to the mode-selection control system of the transport so that the head is automatically brought into engagement with the tape only during the record mode and is swung away during other modes, reducing wear on the tape. A dashpot is coupled to delay operation of the arm for a short interval immediately following the selection of a new mode, when the tape is accelerating or decelerating and when the resulting tension is greater than normal. Thus, the head is never brought into engagement with the tape until the tension has returned to normal, and wear due to excessive tension is avoided.

What is claimed is:

1. In a magnetic tape transport having an erase head and a record system both operable during the record mode of said transport, the combination comprising:

means for bringing said tape and erase head into erasing engagement and for mutually retracting said tape and erase head from such engagement; and means coupled between said first-named means and said record system for operation of said first-named means to effect said erasing engagement only during the record mode of operation of said transport, and to effect mutual retraction of said erase head and tape during other modes of operation of said transport;

said last-named means being arranged to effect said operation of said first-named means a predetermined time delay after the initiation of at least said record mode of said machine to provide reduced frictional wear of said tape.

2. In a magnetic tape transport having an erase head and a record system both operable during the record mode of said transport, the combination comprising:

means for bringing said tape and erase head into erasing engagement and for mutually retracting said tape and erase head from such engagement;

said means including a member on which said erase head is mounted, said member being mounted for rotation about an axis parallel to the plane of said tape and transverse to the length thereof and between positions confronting and avoiding said tape;

said means also including a pair of guides for guiding said tape on a path engaging said erase head only in said tape-confronting position thereof; and means coupled between said first-named means and said record system for operation of said first-named means to effect said erasing engagement only during the record mode of operation of said transport, and to effect mutual retraction of said erase head and tape during other modes of operation of said transport;

said last-named means being arranged to effect said operation of said first-named means a predetermined time delay after the initiation of at least said record mode of said machine to provide reduced frictional wear of said tape.

3. In a magnetic tape transport having an erase head and a record system both operable during the record mode of said transport, the combination comprising:

means for bringing said tape and erase head into erasing engagement and for mutually retracting said tape and erase head from such engagement;

said means including a member on which said erase head is mounted, said member being mounted for eccentric rotation of said erase head about an axis parallel to the plane of said tape and transverse to the length thereof and between positions confronting and avoiding said tape;

said means also including a pair of guides for guiding said tape on a path engaging said erase head only in said tape-confronting position thereof; and means including a solenoid coupled to said member and to said record system for rotation of said member to effect said erasing engagement of said erase head only during the record mode of operation of said transport, and to effect retraction of said erase head from said tape during other modes of operation of said transport;

said last-named means being arranged to effect said rotation of said member in timed delay after the initiation of said record mode of said machine to provide reduced frictional wear of said tape.

4. In a magnetic tape transport having an erase head and a record system both operable during the record mode of said transport, the combination comprising:

means for bringing said tape and erase head into erasing engagement and for mutually retracting said tape and erase head from such engagement;

said means including a member on which said erase head is mounted, said member being mounted for eccentric rotation of said erase head about an axis parallel to the plane of said tape and transverse to the length thereof and between positions confronting and avoiding said tape;

said means also including a pair of guides for guiding said tape on a path engaging said erase head only in said tape-confronting position thereof; and means including a solenoid coupled to said member and to said record system for rotation of said member to effect said erasing engagement of said erase head only during the record mode of operation of said transport, and to effect retraction of said erase head from said tape during other modes of operation of said transport;

said last-named means also including a dashpot coupled to said member and solenoid to delay said rotation of said member for a predetermined time after the initiation of any of said modes of said machine to provide reduced frictional wear of said tape.

5. In a magnetic tape transport having an erase head and a record system both operable during the record mode of said transport, the combination comprising;

means for bringing said tape and erase head into erasing engagement and for mutually retracting said tape and erase head from such engagement;

said means including a member on which said erase head is mounted, said member being mounted for eccentric rotation of said erase head about an axis parallel to the plane of said tape and transverse to the length thereof and between positions confronting and avoiding said tape;

said means also including a pair of guides for guiding said tape on a path engaging said erase head only in said tape-confronting position thereof; and means including a rotary solenoid coupled to said member and to said record system for energization of said solenoid and rotation of said member in a direction opposite the record mode direction of motion of said tape and to said tape confronting and engaging position of said erase head upon actuation of said record system to produce the record mode of operation of said transport, and to de-energize said solenoid upon de-actuation of said record system to permit any of the other modes of operation of said transport, said solenoid including spring means for rotation of said solenoid in the record mode direction of motion of said tape and to said tape-avoiding position of said member and erase head upon said de-energization of said solenoid;

said last-named means also including a dashpot coupled to said member and solenoid to delay said rotation of said member for a predetermined time after the initiation of any of said modes of said machine to provide reduced frictional wear of said tape.

References Cited

UNITED STATES PATENTS 2,535,498 12/1950 Kornei ---------- 179—100.2 X
3,185,484 5/1965 Burdeno ----------- 179—100.2

BERNARD KONICK, *Primary Examiner.*

A. I. NEUSTADT, *Assistant Examiner.*